Patented Mar. 26, 1940

2,194,517

UNITED STATES PATENT OFFICE 2,194,517

CONTACT INSECTICIDE

Euclid W. Bousquet, Wilmington, Del., assignor to E. I. du Pont de Nemours & Company, Wilmington, Del., a corporation of Delaware No Drawing. Application October 26, 1937, Serial No. 171,066

9 Claims. (Cl. 167—22)

This invention relates to contact insecticides containing as an active constituent an aliphatic compound containing a thiocyanated acyclic hydrocarbon residue of at least 10 carbon atoms and, as a substituent on such residue, a water-solubilizing polar group; and more particularly to the ortho-dithiocyanated compounds (i. e., compounds having a thiocyanate radical on each of adjacent carbons), and particularly to the sodium salts of the ortho-dithiocyanated long chain aliphatic carboxylic acids.

Short chain organic thiocyanates are known to be effective contact poisons but are disadvantageous in respect to their offensive and persistent odor and irritant properties. It has been suggested that short chain organic thiocyanates be substituted with negative groups such as oxygen, sulfur, and iodine, in order to reduce the offensive odor and irritant properties. In particular, it has been suggested (U. S. P. 1,808,893) that short chain organic thiocyanates be etherified or esterified for this purpose.

Long chain organic thiocyanates are likewise recognized as excellent contact poisons. They offer the additional advantages of being readily soluble in oil and having generally a less offensive and less persistent odor than the short chain organic thiocyanates. The long chain organic thiocyanates, however, are difficult to emulsify.

I have found that the emulsifying and wetting-out properties of the higher molecular weight organic thiocyanates may be materially improved by introducing therein a water-solubilizing polar group. The term "polar group" may be interpreted from Eucken "Fundamentals of Physical Chemistry", page 220, to mean hydroxyl, amine, acid, and salt groups. By "water-solubilizing polar group" I mean those polar groups which have such an exceptionally strong polarity that they confer to compounds having heavy hydrocarbon residues and ability to be dispersed in water, that is, sulfate, sulfonate, and carboxyl groups, and salts of such groups. Thus I have found it possible to combine in one organic compound these water-solubizilizing polar groups, the thiocyanate radical, and a heavy hydrocarbon residue and obtain a contact insecticide which has a combination of desirable properties, i. e., high toxicity, ability to be dispersed in water easily, and unusual penetrability into insects.

These compounds may be comprehensively expressed by the formula G—R—(SCN)$_x$ wherein G is the water-solubilizing polar group, R is an acyclic hydrocarbon residue of at least 10 carbon atoms, and $x$ is an integer equal to the valence of R less one. The above compounds, in addition to being highly toxic, have improved susceptibility to emulsification, readily form stable emulsions, and have improved wetting-out properties. The sodium salts of the dithiocyanated long chain aliphatic carboxylic acids are particularly advantageous as they readily form colloidal solutions having excellent wetting-out properties without the use of a dispersing or wetting agent. Compounds of the above formula in which G is —SO$_2$ONa or —OSO$_2$ONa are particularly advantageous in being stable in hard water or acid solutions.

Among the compounds useful in my invention are:

Dithiocyano-octadecanoic acid
Dithiocyano sodium octadecanoate
Dithiocyano undecanoic acid
Dithiocyano sodium undecanoate
Thiocyano lauric acid
Thiocyano-undecyl sulfate
Thiocyano-octadecyl sulfate
Thiocyano-magnesium octadecanoate
Thiocyano sodium dodecyl sulfate
Thiocyano-octadecanoic acid
Dithiocyano sodium undecyl sulfonate
Thiocyano decanoic acid
Dithiocyano sodium docosanoate The compounds listed above are merely illustrative of my invention, it being understood that numerous other compounds of the same class may be used, for example, those produced by thiocyanating saturated and unsaturated carboxylic acids, by thiocyanating sulfonic acids or acid sulfates such as are obtained by reacting corresponding unsaturated alcohols with concentrated sulfuric acid, oleum or chlorosulfonic acid, and by sulfonating or sulfating unsaturated thiocyanates.

I have used the terms "sulfating" and "sulfonating" alternatively, because there is some doubt whether the reaction with sulfuric acid and the equivalents referred to above results in a substituent of the type —SO$_3$H or —OSO$_3$H. As it is not material to my invention which of these substituents is present, it is to be understood that the term "sulfate" shall be interpreted as including the "sulfonate".

The following example, in which parts are by weight, illustrates the preparation and use of these compounds as contact insecticides:

*Dithiocyano-octadecanoic acid*

A solution of 29 parts of oleic acid (U. S. P.)

in 63 parts of glacial acetic acid was thiocyanated below 15° C. with thiocyanogen which has previously been prepared by adding a solution of 16.5 parts of bromine and 42 parts of glacial acetic acid to a mixture of 24 parts of sodium thiocyanate and 105 parts of glacial acetic acid with the temperature below 15° C. The reaction mixture was allowed to stand at room temperature for several hours after which a heavy yellow precipitate was removed by filtration. The acetic acid filtrate was drowned in water, whereupon a heavy yellow oil separated which was extracted with ether and the ether extract subsequently washed with several portions of water. The product after removal of the volatile materials, including the excess acetic acid, gave a neutral equivalent of 399, as compared with 398 for the calculated value for dithiocyano-octadecanoic acid. An aqueous solution possessing the characteristics of soap solutions was prepared by reacting equivalent amounts of the above thiocyanated acid with sodium hydroxide in water. When this compound is used in dilute aqueous solutions, it forms a spray which has good wetting and spreading qualities and is effective as a substitute for nicotine in the control of soft bodied insects, particularly aphids.

The dithiocyanated docosanoic, undecanoic and like acids can be prepared from the corresponding unsaturated acids and utilized as insecticides in accordance with the general methods given above. Similarly sodium 9,10-octadecenyl sulfate may be dithiocyanated and the sodium salt of the resulting dithiocyano-octadecyl sulfate used as an insecticide.

The compounds according to my invention are particularly useful in aqueous solutions or emulsions. They may, however, be used in kerosene solutions for the control of house flies. They are also useful as a toxic ingredient for increasing the efficiency of mineral oil sprays.

When used as aqueous solution, I prefer to use the sodium salts. It will be readily apparent, however, that the other alkali metal salts, ammonium salts or amine salts such as the salt of triethanolamine, may be used. When hard water is used it is desirable to use the corresponding salts of the sulfonic acids or sulfates.

While I have disclosed my invention with reference to certain specific compounds, it is to be understood that the invention is in no way limited thereto but that numerous variations may be made both with respect to the positions of the water-solubilizing polar group and with respect to the number and position of the thiocyano group, the only criteria being that the compounds be aliphatic, that they contain an acyclic hydrocarbon residue of at least 10 carbon atoms, and that they have as a substituent on such residue a water-solubilizing group.

I claim:

1. An insecticidal composition containing a compound of the formula G—R—(SCN)$_x$, where G is a water-solubilizing polar group, R is an acyclic hydrocarbon residue of at least 10 carbon atoms, and $x$ is an integer equal to the valence of R less one.

2. An insecticidal composition containing a compound of the formula

where G is a water-solubilizing polar group, R is an acyclic hydrocarbon residue, R' is selected from the group consisting of hydrogen and an acyclic hydrocarbon residue, and R plus R' contain at least 8 carbon atoms.

3. An insecticidal composition containing a compound of the formula

where R is an acyclic hydrocarbon residue, R' is selected from the group consisting of hydrogen and an acyclic hydrocarbon residue, and R plus R' contain at least 8 carbon atoms.

4. An insecticidal composition containing sodium dithiocyano-octadecanoate.

5. An insecticidal composition containing a compound of the formula G—R—(SCN)$_x$ where G is a water-solubilizing polar group selected from the class consisting of sulfate, sulfonate and carboxyl groups, and salts of such groups, R is an acyclic hydrocarbon residue of at least 10 carbon atoms and $x$ is an integer equal to the valence of R less one, said compound having the property of imparting the characteristic of soap solutions to dilute aqueous sodium hydroxide solutions.

6. An insecticidal composition containing a compound of the formula

where G is a water-solubilizing polar group selected from the class consisting of sulfate, sulfonate and carboxyl groups, and salts of such groups, R is an acyclic hydrocarbon residue, R' is selected from the group consisting of hydrogen and an acyclic hydrocarbon residue, and R plus R' contain at least 8 carbon atoms, said compound having the property of imparting the characteristic of soap solutions to dilute aqueous sodium hydroxide solutions.

7. An insecticidal composition containing a thiocyanated soap.

8. An insecticidal composition containing dithiocyano-octadecanoic acid.

9. An insecticidal composition containing thiocyanoundecyl sulfate.

EUCLID W. BOUSQUET.